United States Patent
Granz et al.

(10) Patent No.: US 10,347,285 B1
(45) Date of Patent: Jul. 9, 2019

(54) MICROWAVE ASSISTED MAGNETIC RECORDING DRIVE UTILIZING INTERLACED TRACK RECORDING

(71) Applicant: Seagate Technology LLC, Cupertino, CA (US)

(72) Inventors: Steven Douglas Granz, Shakopee, MN (US); Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/006,345

(22) Filed: Jun. 12, 2018

(51) Int. Cl.
    *G11B 5/00* (2006.01)
    *G11B 20/12* (2006.01)

(52) U.S. Cl.
    CPC .. *G11B 20/1217* (2013.01); *G11B 2005/0024* (2013.01); *G11B 2020/1238* (2013.01); *G11B 2020/1292* (2013.01)

(58) Field of Classification Search
    CPC ....... G11B 5/09; G11B 5/012; G11B 20/1217; G11B 20/1833; G11B 11/10506; G11B 11/10515; G11B 11/10521; G11B 11/10595; G11B 2005/0021; G11B 2020/1222; G11B 2020/1238; G11B 5/6088
    USPC ............................................. 360/48, 59, 318
See application file for complete search history.

(56) References Cited

U.S. PATENT DOCUMENTS

| | | |
|---|---|---|
| 9,099,103 B1 | 8/2015 | Krichevsky |
| 9,508,362 B2 * | 11/2016 | Gao ........................ G11B 5/09 |
| 9,830,944 B1 | 11/2017 | Mendonsa et al. |
| 2013/0229895 A1 | 9/2013 | Shiroishi et al. |
| 2016/0148642 A1 | 5/2016 | Gao et al. |

* cited by examiner

*Primary Examiner* — Nabil Z Hindi
(74) *Attorney, Agent, or Firm* — Hollingsworth Davis, LLC

(57) ABSTRACT

Bottom tracks are written to a recording medium using a first setting of a microwave assisted magnetic recording (MAMR) head. Top tracks are interlaced between and partially overlapping the bottom tracks using a second setting of the MAMR head, the second setting resulting in a narrower track width than the first setting.

20 Claims, 6 Drawing Sheets

MICROWAVE ASSISTED MAGNETIC RECORDING DRIVE UTILIZING INTERLACED TRACK RECORDING

SUMMARY

Various embodiments described herein are generally directed to a microwave assisted magnetic recording drive utilizing interlaced track recording. In one embodiment, bottom tracks are written to a recording medium using a first setting of a microwave assisted magnetic recording (MAMR) head. Top tracks are interlaced between and partially overlapping the bottom tracks using a second setting of the MAMR head, the second setting resulting in a narrower track width than the first setting.

In another embodiment, bottom tracks are written to a recording medium using a first microwave power of a MAMR head and a first linear bit density. The first microwave power results in a first track width of the bottom tracks. Top tracks are written interlaced between and partially overlapping the bottom tracks using a second microwave power of the MAMR head and a second linear bit density. The second microwave power is lower than the first microwave power and results in a second track width less than the first track width. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
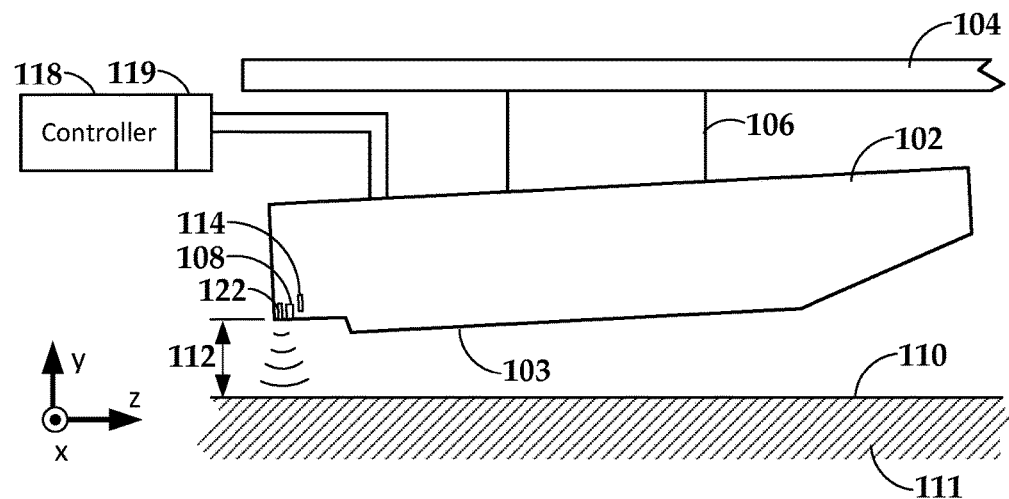
FIG. 1 is a diagram illustrating a magnetic recording device according to an example embodiment.

The present disclosure generally relates to data storage devices that utilize magnetic storage media, e.g., disks. Recording schemes have been developed to increase areal density for conventional magnetic recording (CMR) devices, e.g., perpendicular magnetic recording (PMR) as well as devices using newer technologies, such as heat-assisted magnetic recording (HAMR), microwave-assisted magnetic recording (MAMR). One of these recording schemes is interlaced magnetic recording (IMR), which generally involves writing some tracks that partially overlap previously written tracks. This allows writing the tracks at a narrower width than would be possible in conventional recording schemes, where tracks are spaced apart to prevent crosstrack interference. While IMR-recorded tracks cannot be randomly updated as easily as conventionally-recorded tracks, the drive architecture can be adapted to minimize the effects on random writes.

In a disk drive utilizing interleaved magnetic recording (IMR), there are two types of data tracks written. The first is a bottom track, which is generally written at higher linear density using a wider write head, or using a write configuration that results in a wider track being written. The second is a top track, which is generally written at lower linear density using a narrower write head, or using a write configuration that results in a wider track being written. The bottom tracks are written first, with a relatively wide spacing between, and then the top tracks are written in the spacing between adjacent top tracks. The intent of writing the top tracks is to encroach enough on the adjacent bottom tracks to partially overwrite the bottom track edges. Because these track edges tend to have poorer SNR than the middle of the track, overwriting the edges has a minor impact on the overall bottom track SNR.

The different characteristics of the top and bottom IMR tracks can complicate writing the data from those tracks. The top and bottom tracks will usually have different characteristics, including track width, linear bit-density, signal-to-noise ratio, etc. Typically, a conventional write pole will not significantly increase write width (which defines track width) in response to changes in write current applied to a write coil that magnetizes the pole. Therefore, IMR recording that utilizes conventional recording heads (e.g., PMR writer) may use strategies such as two or more writers with different widths to write top and bottom tracks.

In order to reduce costs and complexity, it is desirable to have a single write transducer that can write both top and bottom tracks in an IMR drive. In embodiments described below, a MAMR write transducer is used to write tracks having different width and other characteristics. Such a transducer can be used to write the top and bottom tracks for IMR with a single head, and may have other uses. For example, in some cases a drive may be configured to write data with different bit-aspect ratios (BAR) in different regions of the drive. This may be used to maximize storage space, increase performance, customize performance for end-user specification, etc. Being able to write at significantly different track widths via MAMR allows a wider range of BAR to be used.

In FIG. 1, a block diagram shows a side view of a read/write head 102 (also referred to as a "read head," "write head," "recording head," etc.) according to an example embodiment. The read/write head 102 may also be referred to herein as a write head, read head, recording head, etc. The read/write head 102 is part of slider that is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 may be configured as a MAMR device, and so includes additional components that assist the read/write transducer 108. A spin-torque oscillator (STO) 122 used with the read/write transducer 108 which, together with a magnetic write pole, generates a powerful but localized magnetic field. This increases the magnetic field over what can be provided by the write pole itself. As such, a recording medium with higher magnetic coercivity can be used compared with conventional recording media, thereby allowing reliable storage of bits in a smaller area on the medium compared to conventional media.

The read/write transducer 108 of the read/write head 102 includes one or more read elements, such as a magneto-resistive stack. The read elements are used to form an electrical signal that varies with changes in magnetic field on the recording medium 111. For example, a magneto-resistive element will change resistance in response to changes in local magnetic field. A current passing through the element will vary based on the changes in resistance.

Figure 2:
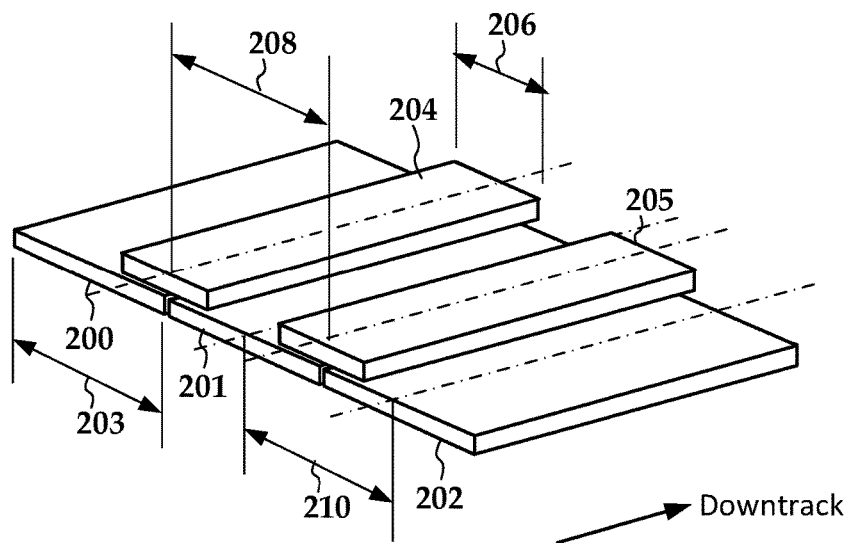
FIG. 2 is a diagram illustrating interlaced magnetic recording tracks according to an example embodiment.

In FIG. 2, a block diagram illustrates IMR tracks according to an example embodiment. In this IMR process, bottom tracks 200-202 are first written the recording medium using a bottom track width 203 and at bottom track pitch 210. Top tracks 204, 205 are then written partially overlapping between respective bottom tracks 200-202, and therefore are interlaced between the bottom tracks 200-202. The top tracks are written at a top track width 206 and at top track pitch 208. Note that the tracks 200-202, 204 and 205 are not multi-level, and the illustrated stacking of tracks is for purposes of explanation and not intended to be a physical representation of IMR tracks.

Because the bottom tracks 200-202 are written at a relatively large cross-track separation from one another, the bottom tracks 200-202 can be written using a relatively larger width 203 than the top tracks 204, 205 without risk of adjacent track erasure. The larger width 203 enables recording the bottom tracks 200-202 at relatively higher linear bit density than that of the top tracks 204, 205. For a HAMR device, the different widths 203, 206 can be achieved by varying laser power to vary the size of the hotspot in the recording medium. The width and linear bit density of the top and bottom tracks 204, 205, 200-202 define the bit-aspect ratio (BAR) of the respective tracks.

Because individual recording heads and media will have different characteristics due to manufacturing tolerances, each drive may have different top and bottom BAR values that are optimum. In some cases, BAR may be different for different disk surfaces within a drive, and different for different zones within a disk surface. For example, in a MAMR drive, a selected combination of STO power, STO frequency, write coil power, and linear bit density (which can be controlled by a clock that defines bit transitions) can produce a selected BAR for a particular recording regions. Because the STO effect on track width will also have an effect on adjacent track spacing, the value of track spacing may also be defined together with the selected BAR. The combination of linear bit density and track spacing defines the areal density (ADC) for the region being considered.

Writing IMR with MAMR can be relatively straightforward because the track width can be adjusted with a combination of settings that include microwave power, microwave frequency, and write coil power. The bottom tracks 201-203 can be written wide and support a high linear density using a high microwave power and higher write coil power. The top tracks 204, 205 can be written narrow with lower microwave power and lower write coil power. The effect of microwave frequency on the track width can be determined and tuned for particular combinations of heads and media. Also note that in some cases, the microwave power may be zero, such that the head is operating in a CMR mode for one set of the tracks. Bottom tracks experience double sided squeeze by the two adjacent top tracks whereas top tracks are non-squeezed since the neighboring top tracks are two tracks away. Since the top tracks are the only source of encroachment, the top track write triple and microwave power may define defines the track pitch of the entire MAMR IMR system.

The ADC gain for MAMR IMR is from at least three sources. First, bottom track linear density can increase due to increased microwave power. Second, the top track linear density gains from the non-squeezed conditions. Generally, the top tracks do not suffer from adjacent track write interference since the next top track is two tracks away. Third, the track pitch is defined by the top track write current and microwave power which can be lower than MAMR CMR and gives a narrower track, thereby enabling high track density.

One complication in using IMR relates to the order that tracks are written. Top tracks can be re-written as many times as needed but to overwrite a bottom track with top tracks present, the adjacent top tracks may need to be read and then re-written after the bottom track is written. A shingled magnetic recording (SMR) arrangement has similar issues, in that updating a bottom track may require reading and rewriting any tracks that overlap the bottom track.

One way to deal with track writing order is to group top tracks and bottom tracks into different logical bands. The system performance penalty for IMR will be similar or less than SMR because there are at most two tracks that overlap a bottom track. For SMR, there may be more than two sequentially-written and overlapping tracks that need to be rewritten in response to updating a bottom track. The workload of the drive and the architecture may also favor IMR, e.g., in cases where certain types of data (e.g., write-once, read-many) can be placed in bottom tracks to reduce impact on system performance.

Figure 3:
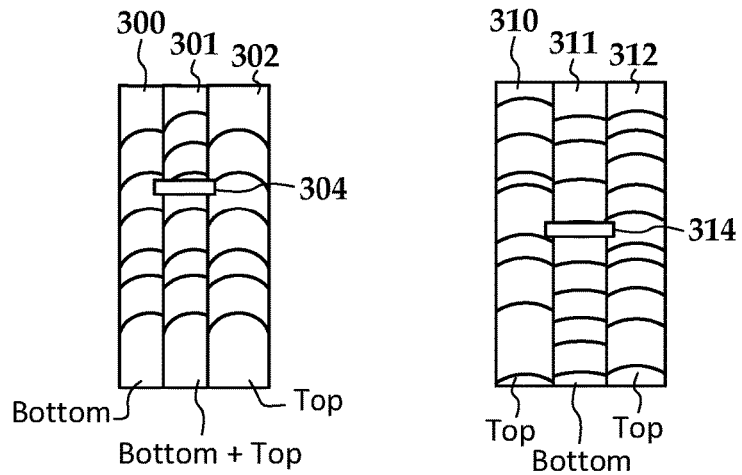
FIG. 3 is a block diagram illustrating interlaced and shingled tracks according to an example embodiment.

There may be other drive architecture advantages to MAMR IMR over MAMR SMR related to drive performance. The MAMR SMR ADC gains are mostly in track pitch while the MAMR IMR ADC gains are in linear bit density. This means that MAMR IMR can increase data rate over MAMR SMR. The linear density gain of the bottom track in MAMR IMR is not achievable with MAMR SMR, even if large microwave powers are used since IMR uses the straight trimmed track center whereas MAMR SMR uses the curved track edge. This is shown by the block diagram in FIG. 3, which shows IMR and SMR tracks that may be written by a device according to an example embodiment.

Shingled tracks 300-302 are shown on the left of the figure. The SMR tracks are shown written from left to right, with track 300 written first, track 301 written next partially overlapping track 300 and track 301, and finally track 302 written partially overlapping track 301. Because track 301 both overlaps and is overlapped, it is indicated as being both a top and bottom track for purposes of this discussion. A read transducer 304 is shown centered over track 301. Interlaced tracks 310-312 are shown on the right side of the figure. Bottom track 311 is written first, followed by top tracks 310, 312 that are interlaced with and partially overlap edges of the bottom track 311. Read transducer 314 is shown over bottom track 311. Note that for bottom SMR tracks 300, 301, the reader 304 will be centered over a region somewhat to the left of the originally written track center, whereas for the bottom IMR track the reader 314 is centered over the originally written bottom track center. This enables the IMR bottom tracks to yield better signal for a given track width and linear bit density.

Figure 4:
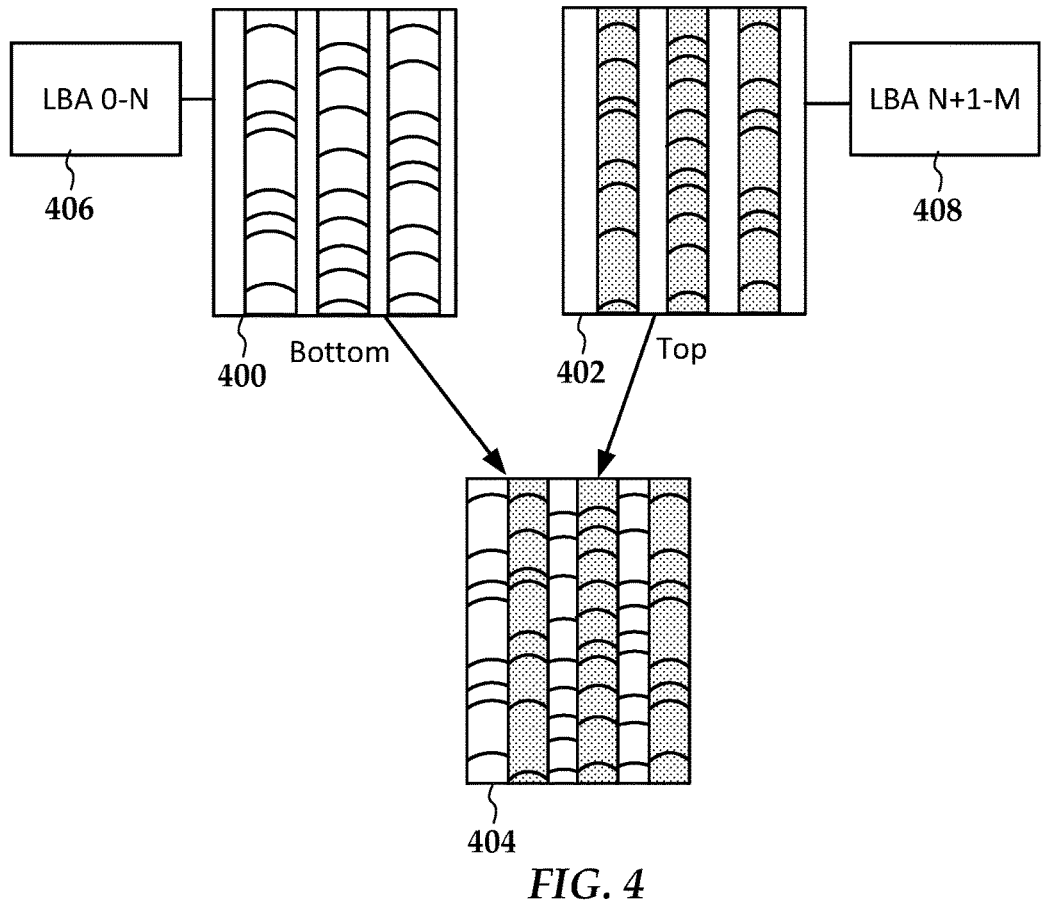
FIG. 4 is a block diagram illustrating a recording schemed according to an example embodiment.

An IMR drive can include features to reduce the impact of the write-order dependence of the bottom tracks. In FIG. 4, a block diagram shows a MAMR IMR track arrangement according to an example embodiment. The tracks are separated into at least two different groups 400, 402, labeled as bottom and top tracks. Each bottom track is next to top tracks and each bottom track is next to top tracks as seen in block 404, where the groups of tracks 400, 402 are shown written to a portion of the disk. However, the tracks within each group 400, 402 may be treated as adjacent tracks during reading and writing.

For example, as indicated by block 406, the bottom tracks 400 may be assigned a first logical block address (LBA) range that is continuous across some or all of the bottom tracks. Similarly, as shown in block 408, the top tracks 402 may be assigned a second LBA range that is continuous across some or all of the top tracks. In this way, the different LBA ranges 406, 408 may be used for different types of data (e.g., sequential, random, write-once-read-many, etc.) that minimizes impact on the additional steps used to update bottom tracks 400. Generally, more active data (e.g., random data) will be targeted to the top tracks 402, and more static data (e.g., sequential data) will be targeted to the bottom tracks 400.

In order to find an optimum value of the density of the tracks, the bottom tracks 400 may be written first to determine the highest linear density possible for this track with the optimized write current parameters and microwave power. Then linear density is reduced such that the on-track bit error rate (BER) has a small BER margin (such as 0.3 decade, for example). The purpose of this BER margin is to assure the bottom tracks 400 have adequate BER after the top tracks are written. Then the top tracks 402 are written using the same head but at a different optimized write current and microwave power.

When the bottom tracks 400 are written, there are no adjacent tracks and therefore no adjacent track interference (ATI), and the writer can be optimized to boost linear density. For example, higher microwave power, higher steady state write currents or write current overshoots can be used for the bottom track. When the top tracks 402 are written, the bottom tracks 400 will be trimmed by the top tracks 402, but information at the center of the bottom tracks 400 will remain. The data on the top tracks 402 in principle has higher ADC since it is not necessary to provision for ATI margin.

Figure 5:
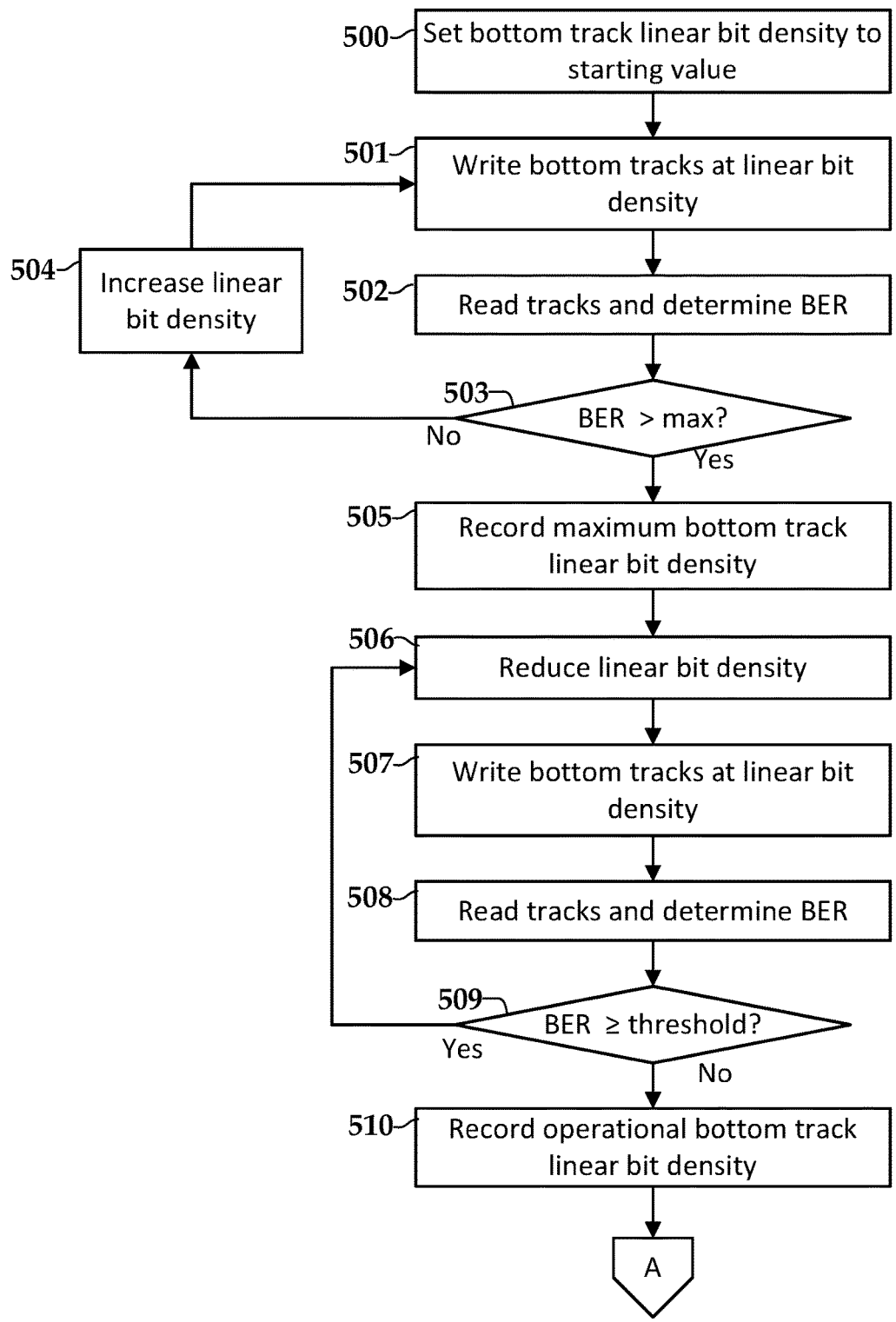
FIGS. 5 and 6 are flowcharts illustrating a procedure according to an example embodiment.

In FIG. 5, a flowchart shows a track calibration procedure according to an example embodiment. This procedure may be performed in a factory environment, e.g., drive calibration, and may also be performed in the field, e.g., user configuration or re-configuration of the drive. The process involves setting 500 a starting linear density for bottom tracks. Bottom tracks (e.g., separated tracks at a bottom-to-bottom track pitch) are written 501 at this density and read back 502 to determine BER of the tracks. If it is determined at block 503 that the BER is below a maximum value (e.g., as specified by drive performance target), then the linear bit density is increased 504, and the writing 501 and reading 503 are repeated until block 503 returns 'yes.'

When block 503 returns 'yes,' the maximum linear bit density has been found for the bottom tracks, and may be recorded 505 for future reference. Thereafter, another iteration is performed that involves reducing 506 the linear bit density, writing 507 and reading 508 tracks similar to before. In this case, the BER is tested 509 to determine if it is above a threshold. The threshold is predefined and generally lower than the maximum allowable BER. Once the BER is at or below this threshold, block 509 returns 'no' and the bottom track linear density is recorded 510 to be used in drive operation. Thereafter the procedure continues as shown in FIG. 6.

Figure 6:
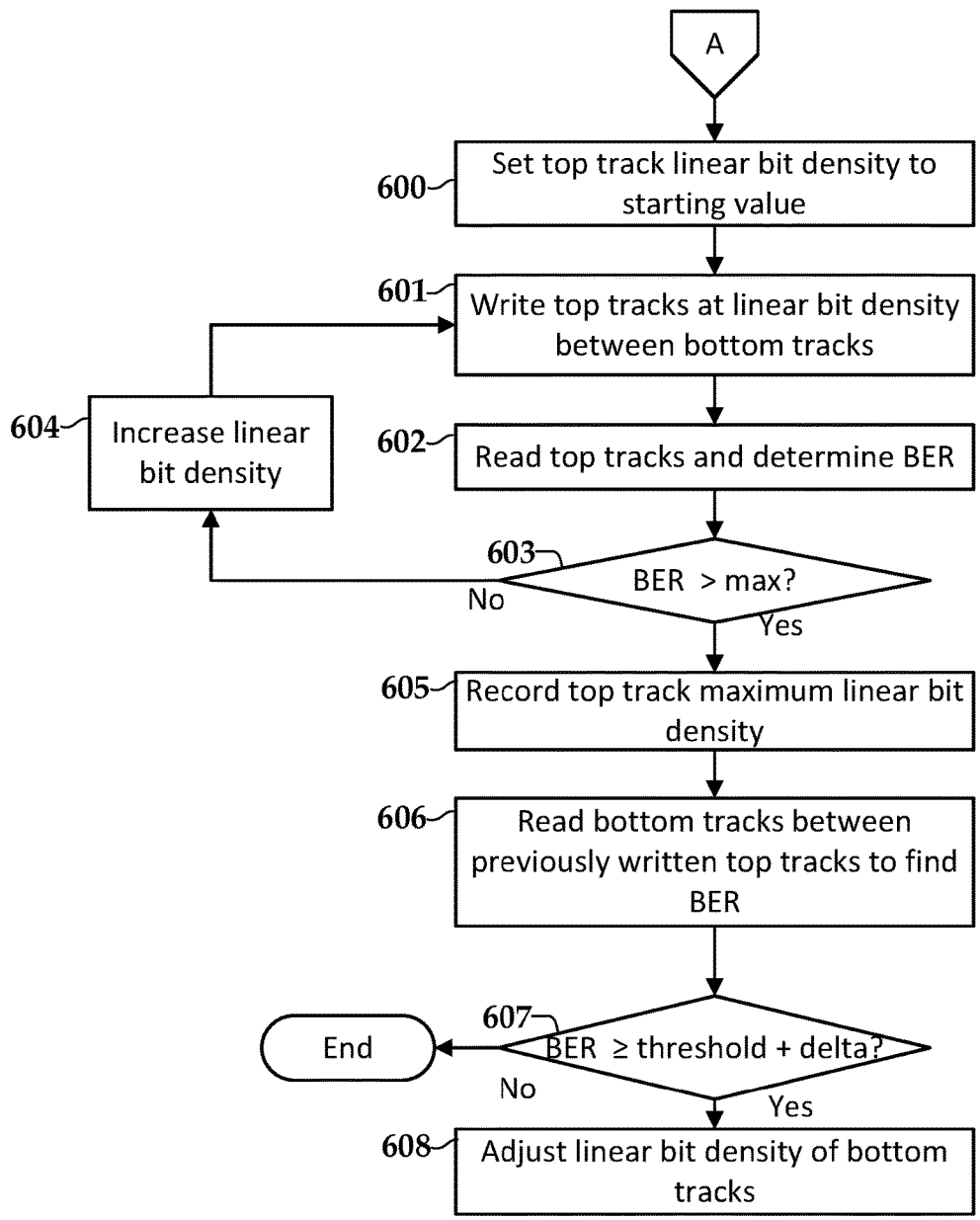

In FIG. 6, a starting top track linear bit density is set 600, and iterations of writing and reading at increasing linear bit densities of the top track is performed as indicated by blocks 600-604. This is used to obtain a maximum top track linear bit density, which is recorded 605 and may be used during operation of the drive together with the bottom track density that was shown being obtained in FIG. 5. After obtaining the top track linear bit density, one or more bottom tracks that are overwritten by top tracks (e.g., tracks written at block 601) are read 606 to find if the BER has changed past some delta over the previous threshold. If the BER has gone past this delta as indicated at block 607, then the linear density of the bottom tracks may be adjusted (e.g., decreased) 608 to compensate. Other changes may be made instead of or in addition to this adjustment 608. For example, track width of the top tracks may be adjusted (e.g., decreased) along with a corresponding change (e.g., decrease) in top track linear bit density.

Figure 7:
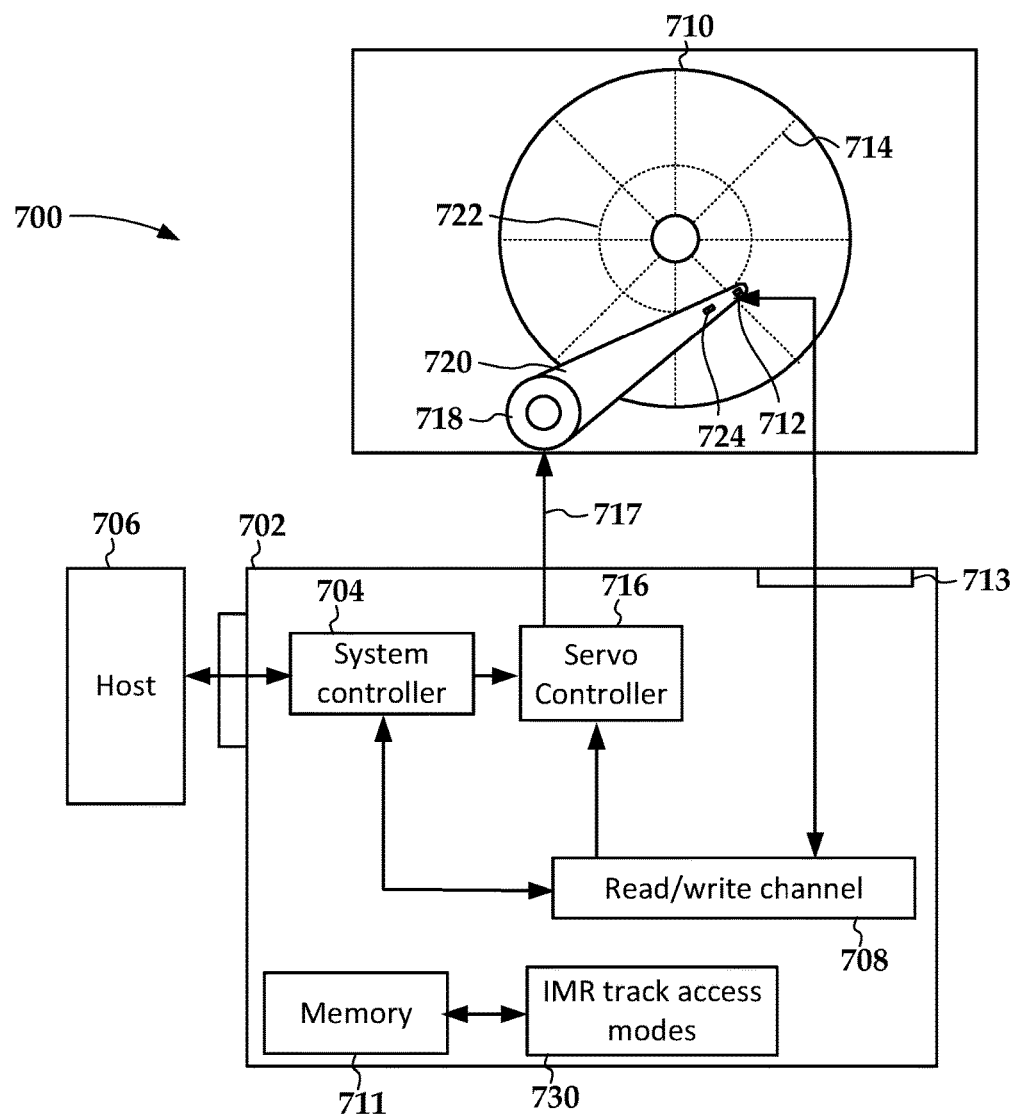
FIG. 7 is a block diagram of an apparatus according to an example embodiment.

In FIG. 7, a diagram illustrates components of a storage drive apparatus 700 that utilizes one or more read/write heads 712 according to example embodiments. The apparatus includes circuitry 702 such as a system controller 704 that processes read and write commands and associated data from a host device 706. The host device 706 may include any electronic device that can be communicatively coupled to store and retrieve data from a data storage device, e.g., a computer. The system controller 704 is coupled to a read/write channel 708 that reads from and writes to surfaces of one or more magnetic disks 710.

The read/write channel 708 generally converts data between the digital signals processed by the system controller 704. The read/write head 712 includes at least one write transducer and a read transducer, and at least one of the heads 712 is configured as a MAMR read/write head. The read/write channel 708 may include analog and digital circuitry such as decoders, timing-correction units, error correction units, etc. The read/write channel is coupled to the heads via interface circuitry 713 that may include preamplifiers, filters, digital-to-analog converters, analog-to-digital converters, etc. The read/write channel 708 includes circuitry to activate a STO integrated in the MAMR head 712 during recording to the disk 710.

The read/write channel 708 may have particular features that facilitate IMR reading and writing. For example, different channel configurations (e.g., parameters for write signals, decoding, timing correction, error correction, etc.) may be used depending on whether a top or bottom track is currently being written/read. The read/write channel 708 may be configured to read and write data differently for different zones of disk 710. For example, some zones may use different writing formats such as SMR, IMR, and conventional tracks.

In addition to processing user data, the read/write channel 708 reads servo data from servo wedges 714 on the magnetic disk 710 via the read/write head. All of the multiple readers of the read/write head may be used to read servo data, or only a subset thereof. The servo data are sent to a servo controller 716, which uses the data to provide position control signals 717 to a VCM 718. The VCM 718 rotates an arm 720 upon which the read/write heads 712 are mounted in response to the control signals 717. The position control signals 717 may also be sent to microactuators 724 that individually control each of the read/write heads 712, e.g., causing small displacements at each head.

An IMR track recording module 730 is stored in memory 711 and is operable to set different recording parameters via the read/write channel 708 when recording different top and bottom tracks. For example, bottom tracks are written to the disk recording medium using a first setting of the MAMR head 712, then top tracks are written interlaced between and partially overlapping the bottom tracks using a second setting of the MAMR head. The second setting resulting in the top tracks being narrower than the bottom tracks written using the first setting. The first and second settings may include different combinations of write coil power, spin-torque oscillator power, and spin-torque oscillator frequency. Note that in this context, only one of write coil power, spin-torque oscillator power, and spin-torque oscillator frequency need be different for the combinations to be different. Also note that the powers may refer dynamic characteristics of current or voltage applied to the write pole and/or spin-torque oscillator, such as steady-state power, rise time, overshoot, etc.

Figure 8:
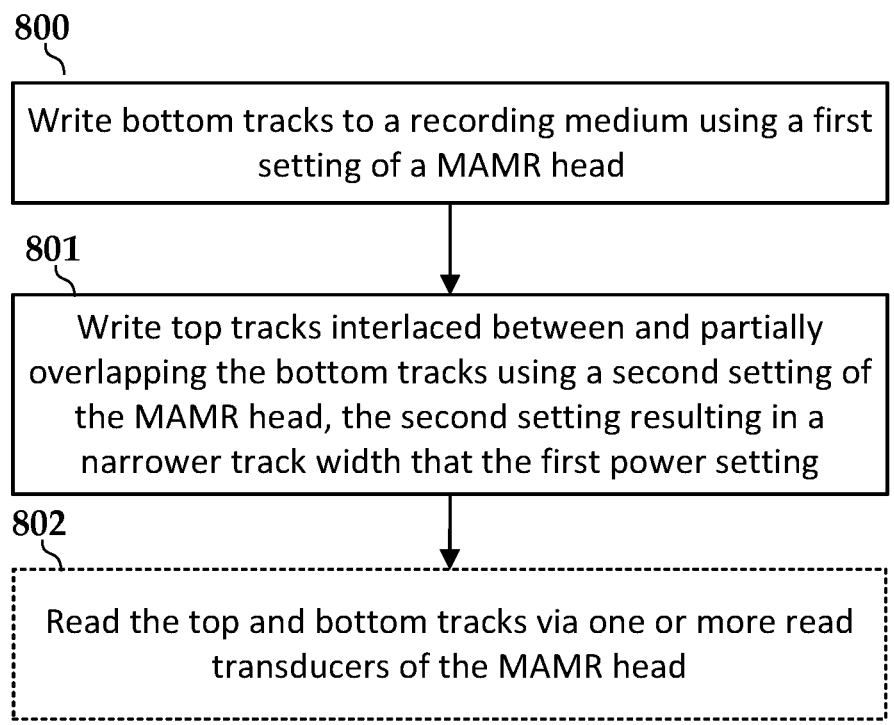
FIG. 8 is a flowchart of a method according to an example embodiment.

In reference now to FIG. 8, a flowchart illustrates a method according to an example embodiment. The method involves writing 800 bottom tracks to a recording medium using a first setting of a MAMR head. Top tracks are written 801 interlaced between and partially overlapping the bottom tracks using a second setting of the MAMR head. The second setting results in a narrower track width than the first setting. The method optionally involves reading 802 the top and bottom tracks via one or more read transducers of the MAMR head. For example, the head may have narrower are wider read transducers that are each optimized to read one of the top and bottom tracks.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    writing bottom tracks to a recording medium using a first setting of a spin-torque oscillator of a microwave assisted magnetic recording (MAMR) head;
    writing top tracks interlaced between and partially overlapping the bottom tracks using a second setting of the spin-torque oscillator, the second setting resulting in a narrower track width than the first setting.

2. The method of claim 1, wherein the first and second settings comprise first and second microwave powers of the spin-torque oscillator.

3. The method of claim 1, wherein for one of the first and second settings, no power is applied to the spin-torque oscillator and for another of the first and second settings a non-zero power is applied to the spin-torque oscillator.

4. The method of claim 1, wherein the first and second settings comprise first and second different combinations of write coil power, spin-torque oscillator power, and spin-torque oscillator frequency.

5. The method of claim 1, wherein the bottom and top tracks are written at different linear bit densities.

6. The method of claim 1, wherein the bottom tracks are assigned to a first logical group and the top tracks are assigned to a second logical band, tracks within the first and second logical bands being treated as adjacent tracks during reading and writing.

7. The method of claim 6, wherein the first and second groups have respective first and second continuous logical block address ranges.

8. The method of claim 6, wherein static data is targeted for the first group and active data is targeted for the second group.

9. The method of claim 1, further comprising, before writing the top and bottom tracks, performing a procedure to determine a target linear bit density of the bottom tracks, the procedure comprising:
    writing first bottom test tracks at increasing linear bit densities until a maximum allowable bit error rate is measured;
    determining a maximum linear bit density associated with the maximum allowable bit error rate;
    starting with the maximum linear bit density, writing second bottom test tracks at decreasing linear bit densities until a threshold bit error rate is determined; and
    setting the target linear bit density of the bottom tracks based on a linear bit density corresponding to the threshold bit error rate.

10. The method of claim 9, wherein the procedure further comprises:
    writing top test tracks at increasing linear bit densities until a second maximum bit error rate is measured at a target linear bit density of the top tracks;
    if writing the top tracks at the target linear bit density partially overlapping the bottom tracks does not increase the threshold bit error rate of the bottom tracks beyond a threshold, using the target linear bit density of the top tracks to write the top tracks, otherwise using a reduced linear hit density less than he target linear bit density of the top tracks to write the top tracks.

11. An apparatus, comprising:
    interface circuitry operable to control a spin-torque oscillator of a microwave assisted magnetic recording (MAMR) head; and
    a controller coupled to the interface circuitry, the controller configured to:
        write bottom tracks to a recording medium of the apparatus using a first setting of the spin-torque oscillator;
        write top tracks interlaced between and partially overlapping the bottom tracks using a second setting of the spin-torque oscillator, the second setting resulting in a narrower track width than the first setting.

12. The apparatus of claim 11, wherein the first and second settings comprise first and second microwave powers of the spin-torque oscillator.

13. The apparatus of claim 11, wherein for one of the first and second settings, no power is applied to the spin torque oscillator and for another of the first and second settings a non-zero power is applied to the spin-torque oscillator.

14. The apparatus of claim 11, the method of claim 1, wherein the first and second settings comprise first and second different combinations of write coil power, spin-torque oscillator power, and spin-torque oscillator frequency.

15. The apparatus of claim 11, wherein the bottom and top tracks are written at different linear bit densities.

16. The apparatus of claim 11, wherein the bottom tracks are assigned to a first logical group and the top tracks are assigned to a second logical band, tracks within the first and second logical bands being treated as adjacent tracks during reading and writing.

17. The apparatus of claim 16, wherein the first and second groups have respective first and second continuous logical block address ranges.

18. The apparatus of claim 16, wherein static data is targeted r the first group and active data is targeted for the second group.

19. A method, comprising:
    writing bottom tracks to a recording medium using a first microwave power of a spin-torque oscillator of a microwave assisted magnetic recording (MAMR) head and a first linear bit density, the first microwave power resulting in a first track width of the bottom tracks; and
    writing top tracks interlaced between and partially overlapping the bottom tracks using a second microwave power of the spin-torque oscillator and a second linear bit density, the second microwave power being lower than the first microwave power and resulting in a second track width less than the first track width.

20. The method of claim 19, wherein the bottom tracks are assigned to a first logical group and the top tracks are assigned to a second logical band, tracks within the first and second logical bands being treated as adjacent tracks during reading and writing.

\* \* \* \* \*